United States Patent
Munoz-Bustamante

(10) Patent No.: US 6,487,671 B1
(45) Date of Patent: Nov. 26, 2002

(54) ELIMINATION OF TURNAROUND CYCLES ON MULTIPLEXED ADDRESS/DATA BUSES

(75) Inventor: Carlos Munoz-Bustamante, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/162,600

(22) Filed: Sep. 29, 1998

(51) Int. Cl.[7] .............................. G06F 13/42; G06F 1/04
(52) U.S. Cl. ........................ 713/400; 713/500; 326/93
(58) Field of Search ................................ 713/500, 400; 710/110; 711/3

(56) References Cited

U.S. PATENT DOCUMENTS

| | | | | |
|---|---|---|---|---|
| 5,274,770 A | * | 12/1993 | Khim Yeoh et al. | 713/38 |
| 5,388,245 A | * | 2/1995 | Wong | 711/118 |
| 5,440,707 A | * | 8/1995 | Hayes et al. | 711/3 |
| 5,640,518 A | * | 6/1997 | Muhich et al. | 710/110 |
| 5,687,330 A | * | 11/1997 | Gist et al. | 710/305 |
| 5,875,151 A | * | 2/1999 | Mick | 365/191 |
| 6,005,414 A | * | 12/1999 | Reay | 326/63 |

* cited by examiner

Primary Examiner—Thomas Lee
Assistant Examiner—James K. Trujillo
(74) Attorney, Agent, or Firm—Martin J. McKinley

(57) ABSTRACT

In a system having a multiplexed address/data bus, initiator and target devices on the bus use special three mode drivers to achieve fast back-to-back read operations without intervening turnaround cycles. These drivers have voltage, current and Hi-Z modes characterized by low output impedance, high output impedence and very high output impedance, respectively. During a first clock cycle, an initiator device places an address on the bus using voltage mode during the first phase of the clock cycle and current mode during second phase. During a second clock cycle, a target device places data on the bus using voltage mode during the first phase of the clock cycle and current mode during second phase. Because a high impedance current mode precedes a low impedance voltage mode, electrical contention problems are eliminated, even if two devices momentarily drive the bus to opposite logical states. Fast back-to-back write operations are also described.

18 Claims, 5 Drawing Sheets

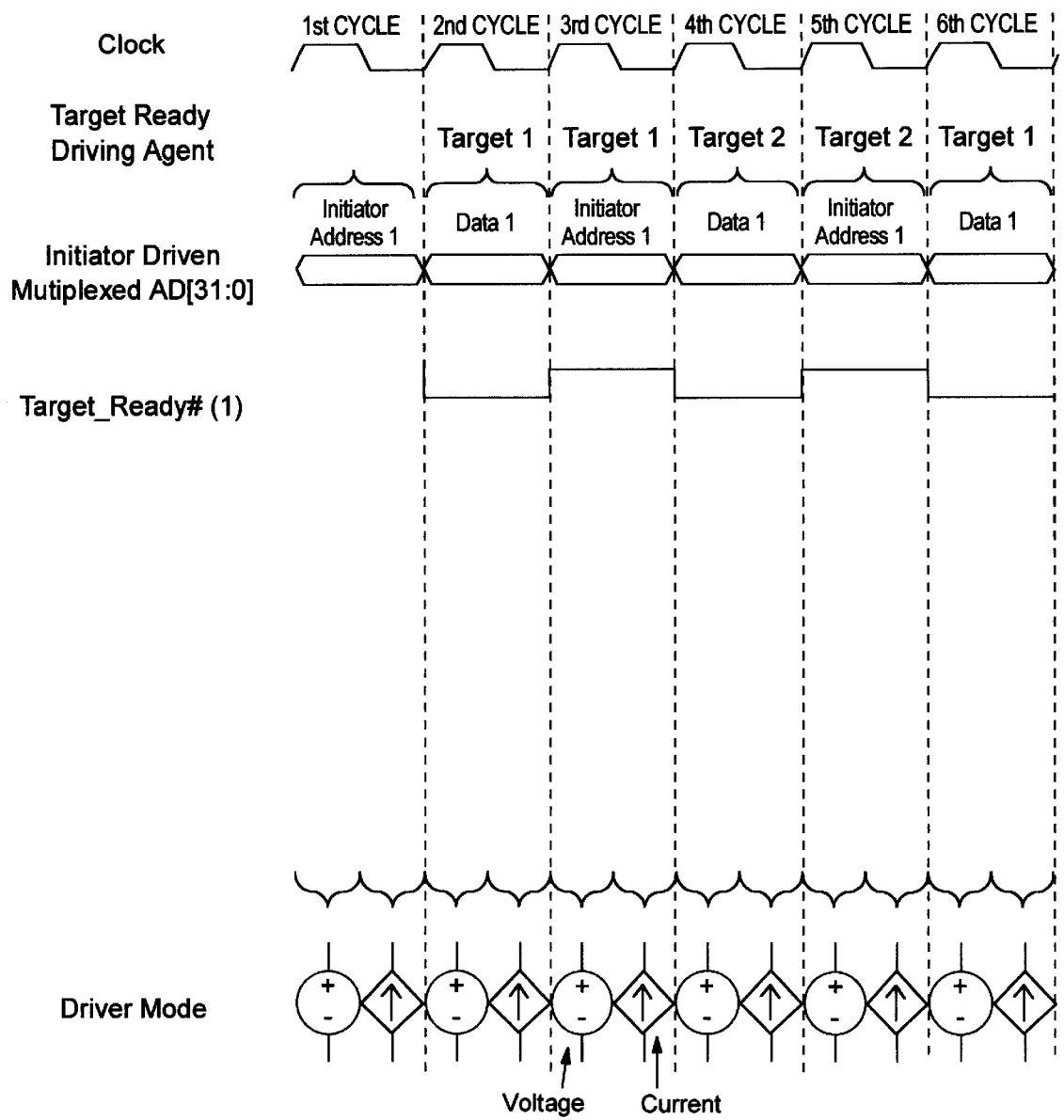

ELIMINATION OF TURNAROUND CYCLES ON MULTIPLEXED ADDRESS/DATA BUSES

BACKGROUND OF THE INVENTION

This invention pertains to computer systems and other information handling systems and, more particularly, to a computer system employing a multiplexed address/data bus in which "turnaround cycles" or "wait cycles" are eliminated.

In the design of computer buses, the reduction in the total number of signal lines is frequently an important criterion. From a mechanical design standpoint, reducing the total number of lines also reduces the total number of pins for any connector that is coupled to the bus. One way to reduce the total number of lines is to "time multiplex" the address and data signals such that there is only one set of "address/data" lines that carry both address and data information, but at different times. In other words, during certain intervals of time address information is transmitted over the address/data lines, while data is transmitted over these same lines during other intervals of time.

One such industry standard bus is the Peripheral Component Interconnect bus or PCI bus. On the PCI bus, 32 bits of address information and 32 bits of data are transmitted over the same 32 address/data lines. If the PCI bus did not use time multiplexing, a total of 64 lines would be needed just to carry the address and data information. Consequently, for PCI, the use of time multiplexing for the address and data signals reduces the total number of signal lines by 32, which also reduces the bus connector "pin count" by the same amount. Consequently, when compared to other competing buses that do not multiplex the address and data signals, the PCI bus has about half the total number of signal lines.

Since two or more devices can drive the bus, electrical contention problems can result. These contention problems are caused by the first device's failure to relinquish the bus before the second device takes over. Consequently, for a brief interval of time, two bus driver circuits coupled to the same line on the bus may be simultaneously attempting to drive that line to two different logic levels. These contention problems become more acute with increased bus speeds.

To alleviate this electrical contention problem, it is common in the industry to have "turnaround cycles" or "wait cycles" allocated between the time when one device is driving the bus and the time when another device takes over. The disadvantage to the insertion of turnaround cycles, however, is that they decrease data throughput. For example, on the PCI bus, turnaround cycles reduce the data throughput by 50% for all non-burst mode read cycles, and for non-burst mode write cycles involving either a change of initiator or target device the throughput is reduced by 33%.

The term "back-to-back write" or "back-to-back read" refers to two or more consecutive data transfer operations (i.e., read or write operations) in non-burst mode between the same initiator device and the same target device, with or without turnaround cycles. For non-burst mode data transfers, address information is transmitted over the bus at the beginning of each individual data transfer operation. For burst mode data transfers, however, consecutive data transfer operations are read from or written to consecutive address locations so that the base address information is only transmitted once at the beginning of each burst of data. The term "conventional back-to-back transfer" refers to a back-to-back transfer that includes turnaround cycles, while the term "fast back-to-back transfer" refers to a back-to-back transfer in which turnaround cycles have been eliminated.

One method for the elimination of turnaround cycles for back-to-back write operations is described in U.S. Pat. No. 5,448, 703. According to this patent, a PCI initiator uses address range checking hardware to detect that two consecutive write cycles are to the same physical target device, and then eliminates turnaround cycles for this type of write operation. This technique for eliminating turnaround cycles for back-to-back writes has been incorporated into version 2.0 of the PCI specification. The '703 patent, however, also explicitly excludes read cycles as candidates for fast back-to-back transfers.

The industry solution to the turnaround cycle problem has another drawback; specifically, write throughput is different from read throughput. Since certain software applications require symmetrical read and write rates, it is necessary to slow the write rate down to equal that of the slower read rate. However, the calculation of the different read and write rates in software is not a trivial problem. Thus, it is desirable for the read throughput and the write throughput to be the same.

Contention is particularly problematic on a multiplexed address/data bus when an initiator device performs a read operation on a register in a target device. Since the initiator device places the address information on the address/data lines first, followed by the target device driving the register data onto the same address/data lines, a turnaround or wait cycle is inserted between the address cycle and the data cycle to prevent contention between the driver circuits in the initiator and the driver circuits in the target. Furthermore, for conventional back-to-back read operations, a turnaround cycle must also be inserted after the target device places data on the address/data lines to separate the previous data cycle from the next address cycle.

Accordingly, the invention described below eliminates turnaround cycles not only for back-to-back writes, but also for back-to-back reads. The elimination of turnaround cycles not only doubles the data throughput for back-to-back read operations, but also makes the data throughput for fast back-to-back read operations equal to the data throughput for fast back-to-back write operations.

To accomplish these advantages, the current invention utilizes a three mode (5state) bus driver circuit, which is described in a related patent application Ser. No. 09/162,618 (now U.S. Pat. No. 6,088,756) and which was filed on the same date as this application. This co-pending application, which is incorporated into this application by reference, is entitled "Five State Bus Driver Having Both Voltage And Current Source Modes Of Operation".

SUMMARY OF THE INVENTION

Briefly, the invention is a method and apparatus for performing data read operations between an initiator device and a target device that are coupled to a bus. A clock signal on one line of the bus includes a plurality of clock cycles wherein each clock cycle includes a first and a second phase. Each of the initiator and target devices includes a three mode bus driver having three selectable modes of operation. The first mode of operation is a voltage mode having a voltage output corresponding to the logical state of the data input to the driver and having a low output impedance. The second mode is a current mode having a voltage output corresponding to the logical state of the data input to the driver and having a high output impedance. And the third mode is a Hi-Z mode having high output impedance. During a first clock cycle, the third mode of operation is selected for the driver of the target device. The initiator device drives a first address onto the bus during the first clock cycle. For the driver of the initiator device, the first mode of operation is selected during the first phase of the first clock cycle and the second mode of operation is selected during the second phase of the first clock cycle. During a second clock cycle, the third mode of operation is selected for the driver of the initiator device, and the target device drives first data onto the bus. For the driver of the target device, the first mode of operation is selected during the first phase of the second clock cycle, and the second mode of operation is selected during the second phase of the second clock cycle.

In another embodiment, the invention is a method and apparatus for performing a data write operation from an initiator device to a first target device that are coupled to a bus. A clock signal on one line of the bus includes a plurality of clock cycles, wherein each clock cycle includes a first and a second phase. Each of the initiator and target devices includes a three mode bus driver having three selectable modes of operation. The first mode of operation is a voltage mode having a voltage output corresponding to the logical state of the data input to the driver and having a low output impedance. The second mode is a current mode having a voltage output corresponding to the logical state of the data input to the driver and having a high output impedance. And the third mode is Hi-Z mode having very high output impedance. During a first and a second clock cycle, the third mode of operation is selected for the driver of the first target device. The initiator device drives a first address onto the bus during the first clock cycle. For the driver of the initiator device, the first mode of operation is selected during the first phase of the first clock cycle. During the second clock cycle, the initiator device drives first data onto the bus. For the driver of the initiator device, the first mode of operation is selected during the first phase of the second clock cycle, and the second mode of operation is selected during the second phase of the second clock cycle.

In still another embodiment, the invention is a method and apparatus for performing a data write operation from an initiator device to a first target device. A clock signal on one line of the bus includes a plurality of clock cycles, wherein each clock cycle includes a first and a second phase. A control signal on a control line of the bus has active and inactive states, wherein the active state is asserted when the target device is ready to accept data from the initiator device. The first target device includes a three mode bus driver having three selectable output modes of operation. The first mode of operation is a voltage mode having a voltage output corresponding to the logical state of the data input to the driver and having a low output impedance. The second mode is a current mode having a voltage output corresponding to the logical state of the data input to the driver and having a high output impedance. And the third mode is Hi-Z mode having very high output impedance. The three mode bus driver of the first target device is coupled to the control line of the bus. The initiator device places a first address on the bus during a first clock cycle. The target device drives the control line active during the second clock cycle. During the first phase of the second clock cycle, the first mode of operation is selected for the driver of the first target device, while the second mode of operation is selected during the second phase of the second clock cycle. During the second clock cycle, the initiator device places first data on the bus.

BRIEF DESCRIPTION OF THE DRAWINGS

FIG. 4a illustrates the bus timings, the driving agent and the driver mode, while FIGS. 4b and 4c illustrate the timing of the various internal and external signals associated with the three mode driver (see FIG. 1 of the aforementioned related patent application, which was incorporated by reference into this application).

FIG. 5 is a timing diagram that illustrates the operation of a fast back-to-back data write operation by an initiator device to a first target device.

DESCRIPTION OF THE PREFERRED EMBODIMENTS

Figure 1:
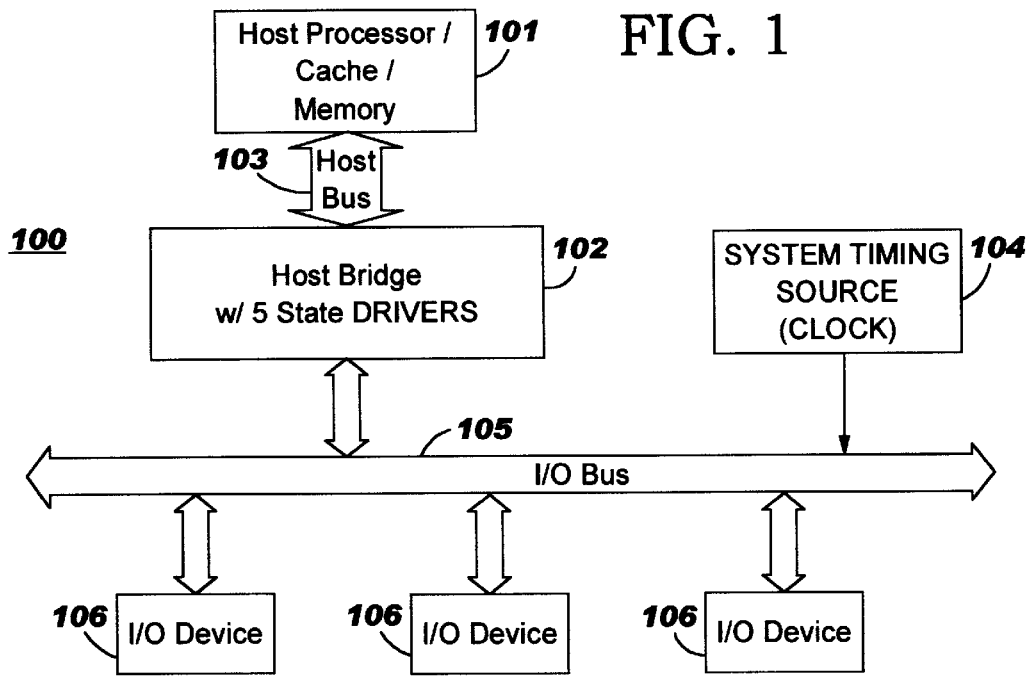
FIG. 1 is a block diagram of a computer system of the present invention wherein a plurality of devices having three mode drivers are coupled to the bus.

Referring to FIG. 1, an Information Processing System, such as Computer System 100, includes a Host Processor Complex 101 (including processor, cache and memory) which is coupled to a Host Bridge Circuit 102 via a Host Bus 103. A System Timing Source or Clock Generator 104, as well as Host Bridge 102, is coupled to an input/output or "I/O" bus 105. Preferably, bus 105 includes multiplexed address/data lines, such as found on a Peripheral Component Interface or "PCI" bus, as described in the PCI Local Bus Specification document, Revision 2.0, which is published by the PCI Special Interest Group of Hillsboro, Oreg. Clock Generator 104 generates the bus clock signal and is coupled to a clock line (not illustrated in FIG. 1) on bus 105. Although a multiplexed address/data bus is preferred, other conventional, non-multiplexed buses may also be used. Furthermore, the invention is not limited to I/O buses, but may also be used with other types of buses. Each Device 106 and Host Bridge Circuit 102 (which, with respect to bus 105, is also a "device") preferably includes a plurality of Three Mode (five state) Driver Circuits, such as the one illustrated in FIG. 1 of the aforementioned copending application, which are used to couple these devices to the address/data and control lines of bus 105 (one driver per line). However, as described in more detail below with reference to "mixed mode" operation, one or more Devices 106 may include conventional two mode (three state) bus drivers.

Figure 2:
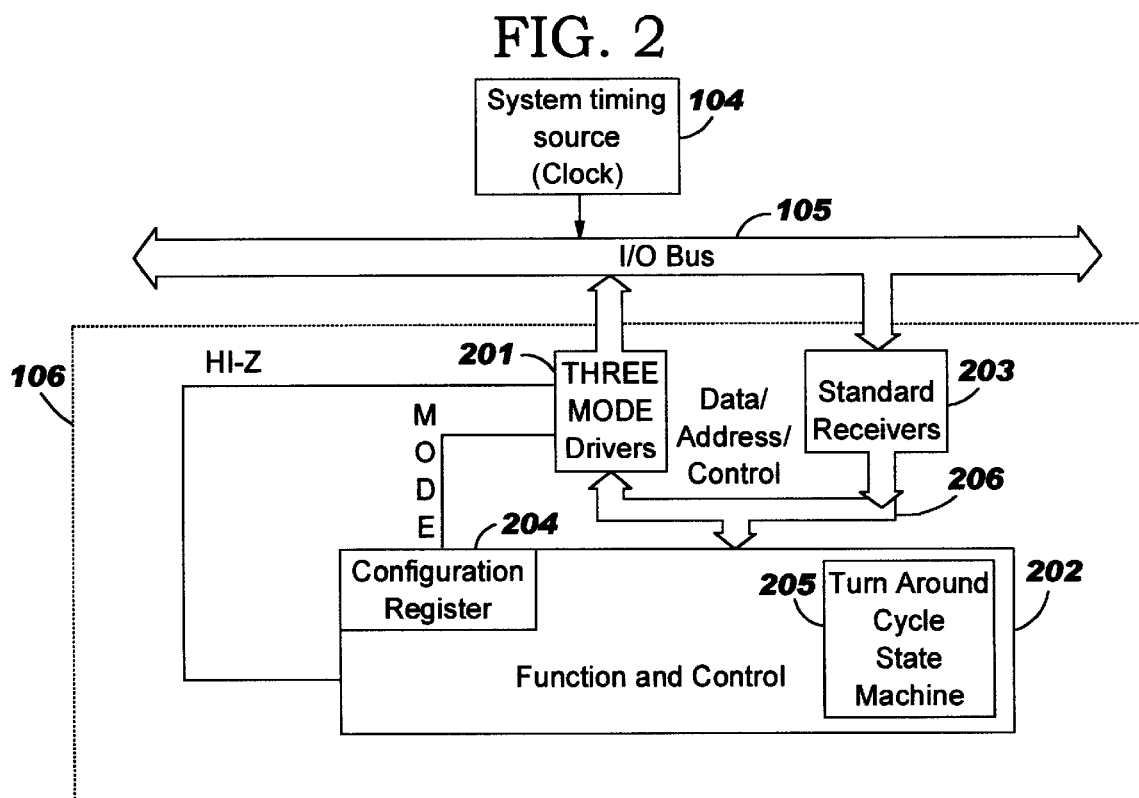
FIG. 2 is a block diagram similar to FIG. 1, but wherein a more detailed diagram of a device having three mode drivers is illustrated.

FIG. 2 is a block diagram similar to FIG. 1, but wherein a more detailed diagram of a Device 106 is illustrated. Referring to FIG. 2, Device 106 includes a plurality of Three Mode Drivers 201, the operating mode of which (either three mode/five state or conventional two mode/three state) is controlled by Function and Control Circuitry 202. Function and Control Circuit 202 can use a well known microprocessor and associated software to implement the function and control described below. In the alternative, this function and control can be implemented using well known state machine design techniques. Well known Standard Bus Receivers 203 are also coupled to bus 105 to receive address, data and control information from the bus and to couple this information to Function and Control Circuit 202. Similarly, Function and Control Circuit 202 outputs address, data and control information to Three Mode Drivers 201 for transfer over bus 105. Function and Control Circuit 202 includes a Configuration Register 204, which contains a bit that is set to select the three mode/five state operating mode and cleared to select the conventional two mode/three state operating mode. Also included in Function and Control Circuit 202 is a well know Turnaround Cycle State Machine 205 for generating the appropriate turnaround cycles when the conventional two mode/three state operating mode is programmed into Configuration Register 204. The three mode/five state mode of operation is usually selected when all Devices 106 coupled to bus 105 include three mode/five state drivers, while the conventional two mode/three state operating mode is selected when one or more devices on the bus includes conventional two mode/three state bus drivers. Consequently, the system presented in FIG. 2 operates in one and only one mode as determined by Configuration Register 204 and, furthermore, the conventional two mode/three state operating mode must be selected if "mixed" Devices 106 are coupled to bus 105 (i.e., some Devices including three mode/five state drivers, and other Devices including conventional two mode/three state drivers).

Figure 3:
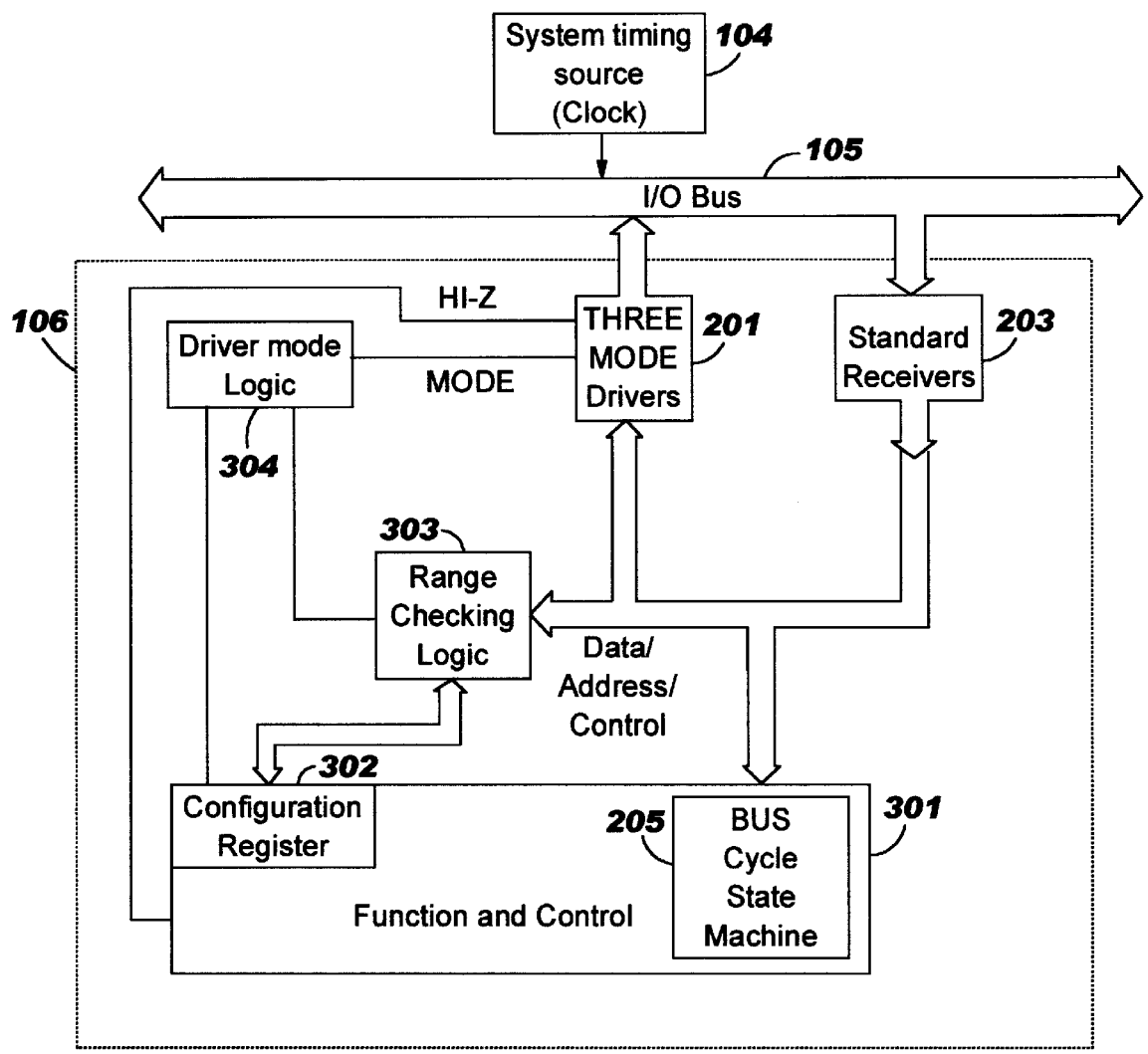
FIG. 3 is a block diagram similar to FIG. 1, but wherein a more detailed diagram of a device having three mode drivers is illustrated, and wherein the device has range checking logic to permit intermixing of devices having three mode and two mode drivers while still permitting fast back-to-back data transfers between any two devices having three mode drivers.

When mixed two mode/three state and three mode/five state Devices 106 are coupled to bus 105, it is preferred that the Devices having three mode/five state drivers be constructed as illustrated in FIG. 3. Referring to this figure, Function and Control Circuitry 301 includes a plurality of Configuration Registers 302. As in FIG. 2, one bit in the Configuration Registers 302 selects either the conventional two mode/three state or the three mode/five state operating mode. When set, another bit selects "mixed mode" wherein a Device having three mode/five state drivers can communicate with a similar Device in the three mode/five state mode, or with another Device having conventional two mode/three state drivers in the conventional mode. This mode selection is accomplished automatically by storing in Configuration Registers 302 the address ranges of all Devices having conventional two mode/three state drivers. Range Checking Circuitry 303 compares the address on internal data/address/control bus 206 (which also includes the clock signal) and outputs an "in-range" signal to Driver Mode Logic 304 whenever the current address is within the range of a Device having conventional two mode/three mode drivers. In response, Driver Mode Logic 304 asserts the mode line to place the Three Mode Drivers in the conventional two mode/three state operating mode and inserts the required turnaround cycles.

Fast Back-to Back Read Operations

Figure 4A:
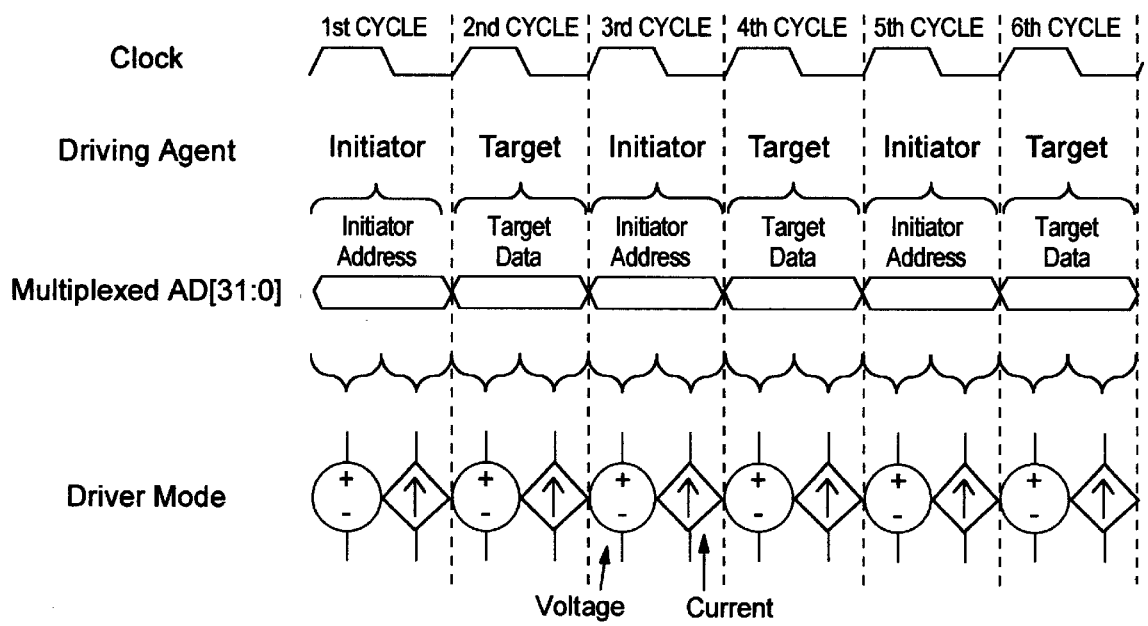
FIGS. 4a, 4b and 4c, which may be referred to collectively as FIG. 4, are timing diagrams that illustrate the operation of a fast back-to-back data read operation.
Figure 4B:
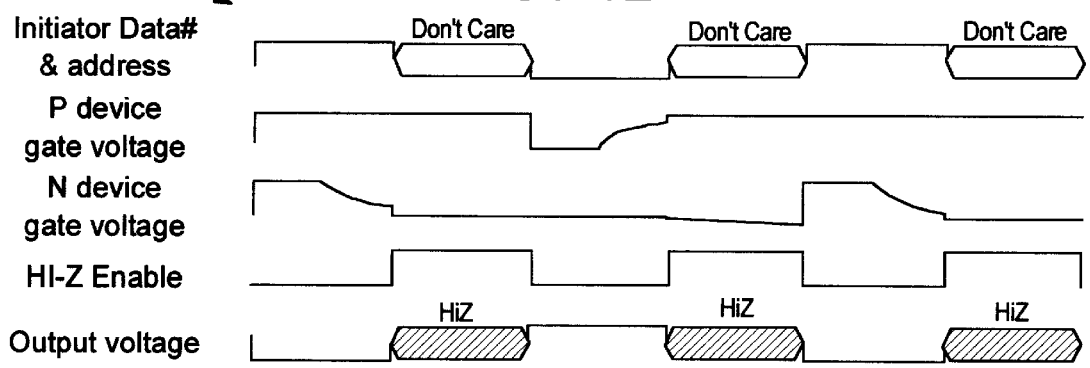
Figure 4C:
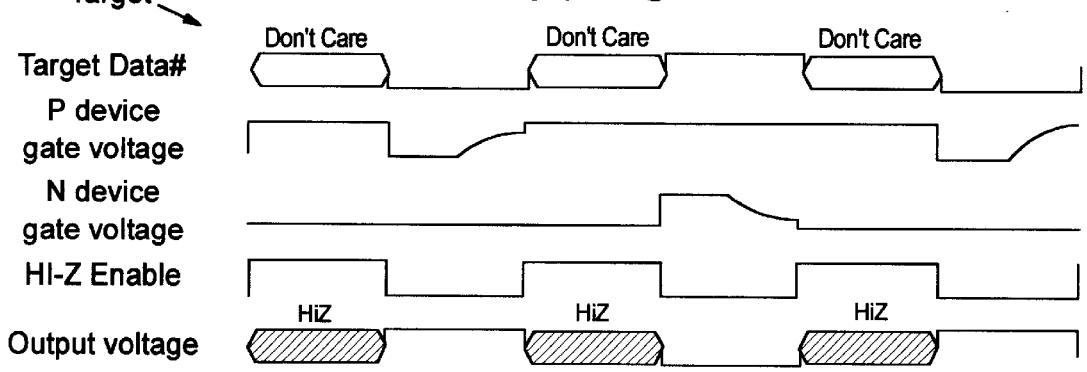

FIG. 4a is a timing diagram for a fast back-to-back read operation of the clock and address/data lines on bus 105, which also indicates the driving agent and driver mode. FIGS. 4b and 4c illustrate the voltages on the various input and output terminals of the three mode/five state driver circuit of FIG. 1 of the aforementioned co-pending application, wherein FIG. 4b illustrates the voltages on a driver circuit in an Initiator Device, and FIG. 4c illustrates the voltages on a driver circuit in a Target Device.

Referring to FIG. 4a, the Initiator Device (one of the Devices 106) places an address on the address/data lines of bus 105 during the first clock cycle. During the first phase of the first clock cycle, the drivers driving the address/data lines are placed in the voltage mode, as indicated by the circular symbol with the "plus" and "minus" signs. In the voltage mode, the outputs of the driver circuits are switched to the low impedance state, which has an output impedance preferably equal to the impedance of bus 105. During the second phase of the first clock cycle, the drivers are switched to the current mode, as indicated by the diamond shaped symbol with the vertically oriented arrow. In the current mode, the outputs of the driver circuits are switched to a high impedance state, which has an output impedance approximately ten times the bus impedance (when the drain to source voltage of the output transistors is low). During the first clock cycle, the driver outputs of the Target Device (another one of Devices 106) are switched to the Hi-Z mode, which is characterized by very high output impedance (many times higher than the output impedance of the drivers in the current mode).

Referring to FIG. 4b and to FIG. 1 of the aforementioned copending application, the input (Initiator Data #) to one of the driver circuits in the Initiator Device is high during the first clock cycle, causing the voltage on the gate of the "P" type transistor to go high, thereby switching the "P" type transistor OFF. At the same time the voltage on the gate of the "N" type transistor goes high during the first phase of the first clock cycle, thereby switching the "N" type transistor ON and pulling the output of the driver to a low voltage, low impedance state. During the second phase of the first clock cycle, the gate voltage on the "N" type transistor goes to an intermediate voltage as determined by the voltage divider resistors, thereby increasing the source-to-drain impedance of the transistor and switching the output to a low voltage, high impedance state.

Referring to FIG. 4c, the Hi-Z enable line is active high during the first clock cycle for the driver circuits of the Target Device. This causes the gate voltages on the "P" and "N" type transistors to go high and low, respectively, thereby switching both transistors OFF and placing the output of the drivers in the Hi-Z or very high impedance mode. This Hi-Z mode prevents any contention between the Initiator and Target Devices during the first clock cycle.

Referring back to FIG. 4a, the Target Device places data (which has been read from the address specified by the Initiator Device in the previous clock cycle) on the address/data lines during the second clock cycle. During the first phase of the second clock cycle, the driver circuits of the Target Device are in the voltage mode, and then switch to the current mode during the second phase of that clock cycle. Because the driver circuits of the Initiator Device are in the current mode during the second phase of the first clock cycle, and if there is a momentary period of time between the first and second clock cycles that both the drivers of the Initiator Device and the drivers of the Target Device are both switched ON, no bus contention problems will result because the drivers in the Initiator Device are in the high impedance current mode.

Referring back to FIG. 4b, the Hi-Z enable line is active high during the second clock cycle for the driver circuits of the Initiator Device. This causes the gate voltages on the "P" and "N" type transistors to go high and low, respectively, thereby switching both transistors OFF and placing the output of the drivers in the Hi-Z or very high impedance mode. This Hi-Z mode prevents any contention between the Initiator and Target Devices during the second clock cycle.

Referring back to FIG. 4c and to FIG. 1 of the aforementioned copending application, the input (Target Data #) to one of the driver circuits in the Initiator Device is low during the second clock cycle, causing the voltage on the gate of the "N" type transistor to go low, thereby switching the "N" type transistor OFF. At the same time the voltage on the gate of the "P" type transistor goes low during the first phase of the second clock cycle, thereby switching the "P" type transistor ON and pulling the output of the driver to a high voltage, low impedance state. During the second phase of the first clock cycle, the gate voltage on the "P" type transistor goes to an intermediate voltage as determined by the voltage divider resistors, thereby increasing the source-to-drain impedance of the transistor and switching the output to a high voltage, high impedance state.

Successive pairs of clock cycles, such as the third and fourth clock cycles, and the fifth and sixth clock cycles, which also are illustrated in FIG. 4, are similar to the first and second clock cycles, except that the data input (Initiator Data # and Target Data #) may be of a different logical state than that illustrated for the first and second clock cycles. It should be noted that the transition from one pair of clock cycles to the next (i.e., the second clock cycle to the third, and the fourth clock cycle to the fifth) is similar to the transition from the first to the second clock cycles. In other words, the second phase of the clock cycle in which the Target Device is driving the bus (i.e., the second, fourth and sixth clock cycles) is always in the high impedance state, thereby preventing any bus contention by the first phase of the following clock cycle in which the Initiator Device is driving the bus.

Fast Back-to-Back Write Operations

FIGS. 5 illustrates fast back-to-back write cycles from an initiator device to a target device. Referring to this figure, for fast back-to-back write operations, the three mode (5state) device drivers that are coupled to the address/data lines of the bus in both in the Initiator and Target Devices are placed in the following modes during the following clock phases and cycles. For the Target Device, these device drivers are placed in the Hi-Z mode at all times during a fast back-to-back write cycle. For the Initiator Device, these device drivers are placed in the voltage mode during the first phase of a first and second clock cycle, and in the current mode during the second phase of the first and second clock cycles. During the first clock cycle, a first address is driven onto the bus and, during the second clock cycle, first data is driven onto the bus.

During the first and second phases of a third and fourth clock cycle, the operating modes of these drivers are the same, respectively, as the operating modes during the first and second phases of the first and second clock cycles. A second address and second data are driven onto the bus during the third and fourth clock cycles, respectively. Because the high impedance current mode of the second phase of a clock cycle always precedes the low impedance voltage mode of the first phase of the following clock cycle, electrical conflicts on the bus are avoided, thereby eliminating the need for intervening turnaround clock cycles.

Figure 6:
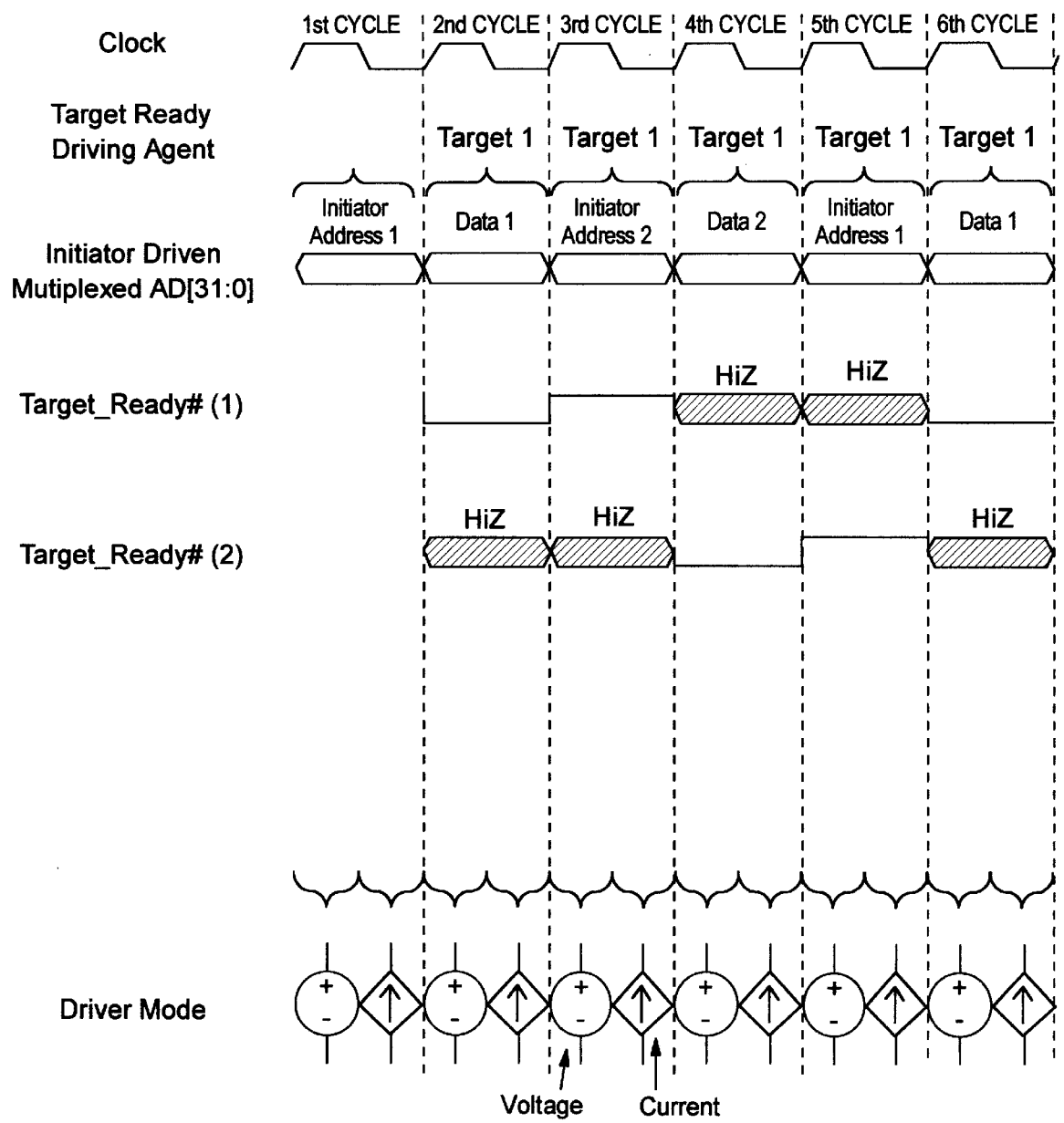
FIG. 6 is a timing diagram that illustrates the operation of a fast back-to-back data write operation by an initiator device to a first target device during first and second clock cycles, and to a second target device during third and fourth clock cycles.

It should also be noted that while the embodiment described above writes data to the same Target Device during consecutive pairs of clock cycles, fast back-to-back writes can also occur to one Target Device during the first pair of clock cycles, and to another Target Device during the next pair of clock cycles. And all without the need to intervening turnaround cycles. This particular process is illustrated in FIG. 6.

So far the mode of the device drivers that are connected to the address/data lines of the bus have been described. But bus 105 also includes control lines, such as the Target Ready ("TRDY") control line of the PCI bus. Since electrical conflicts can also occur on control lines, it may also be necessary for the drivers in Initiator and Target Devices that are coupled to certain control lines, such as TRDY, to be of the three mode/five state design. Following are the various modes of a "TRDY" line device driver in a Target Device for the fast back-to-back write operation described above.

As with the device drivers that are coupled to the address/data lines, a device driver that is coupled to a control line is usually placed in the voltage mode during the first phase of a clock cycle, and in the current mode during the second phase of the clock cycle. During the first clock cycle of the fast back-to-back write operation described above, the driver of a Target Device coupled to the TRDY line is placed in the inactive state during the first and third clock cycles, while the active state, which indicates that the Target Device is ready to receive data, is selected during the second and fourth clock cycles. As described above, the Target Device during the first and second clock cycles can be different from the Target Device for the third and fourth clock cycles. In fact, in order to eliminate turnaround cycles between the two pairs of clock cycles, it is not necessary that the second Target Device (the second Target Device being the device that is selected during the third and fourth clock cycles, which immediately follows the first and second clock cycles) include three mode device drivers and conventional two mode drivers can be used in the second Target Device.

What is claimed is:

1. A method for data read operations between an initiator device and a target device coupled to a bus carrying a clock signal, wherein the clock signal includes a plurality of clock cycles and wherein each clock cycle includes a first and second phase, wherein each of said initiator and target devices includes a three mode bus driver having three selectable output modes of operation: the first mode being a voltage mode having a voltage output corresponding to the logical state of the data input to the driver and having a low output impedance, the second mode being a current mode having a voltage output corresponding to the logical state of the data input to the driver and having a high output impedance, and a third mode having high output impedance, said method comprising the steps of:

for the driver for the target device, selecting the third mode of operation during a first clock cycle;

for the driver for the initiator device, selecting the first mode of operation during the first phase of the first clock cycle and driving a first address onto the bus;

for the driver for the initiator device, selecting the second mode of operation during the second phase of the first clock cycle while driving the first address onto the bus;

for the driver for the initiator device, selecting the third mode of operation during a second clock cycle;

for the driver for the target device, selecting the first mode of operation during the first phase of the second clock cycle and driving first data onto the bus; and for the driver for the target device, selecting the second mode of operation during the second phase of the second clock cycle while driving the first data onto the bus.

2. The method for data read operations of claim 1, further comprising the steps of:

for the driver for the target device, selecting the third mode of operation during a third clock cycle;

for the driver for the initiator device, selecting the first mode of operation during the first phase of the third clock cycle and driving a second address onto the bus;

for the driver for the initiator device, selecting the second mode of operation during the second phase of the third clock cycle while driving the second address onto the bus;

for the driver for the initiator device, selecting the third mode of operation during a fourth clock cycle;

for the driver for the target device, selecting the first mode of operation during the first phase of the fourth clock cycle and driving second data onto the bus;

for the driver for the target device, selecting the second mode of operation during the second phase of the fourth clock cycle while driving the second data onto the bus;

wherein the first, second, third and fourth clock cycles are consecutive clock cycles such that the first and second data are transferred over the bus with no intervening turnaround clock cycles.

3. A method for data write operations between an initiator device and a first target device coupled to a bus carrying a clock signal, wherein the clock signal includes a plurality of clock cycles and wherein each clock cycle includes a first and second phase, wherein each of said initiator and first target devices includes a three mode bus driver having three selectable output modes of operation: the first mode being a voltage mode having a voltage output corresponding to the logical state of the data input to the driver and having a low output impedance, the second mode being a current mode having a voltage output corresponding to the logical state of the data input to the driver and having a high output impedance, and a third mode having high output impedance, said method comprising the steps of:

for the driver for the first target device, selecting the third mode of operation during a first and second clock cycle;

for the driver for the initiator device, selecting the first mode of operation during the first phase of the first clock cycle and driving a first address onto the bus;

for the driver for the initiator device, selecting the first mode of operation during the first phase of the second clock cycle and driving first data onto the bus; and for the driver for the initiator device, selecting the second mode of operation during the second phase of the second clock cycle while driving the first data onto the bus.

4. The method for data write operations of claim 3, further comprising the steps of:

for the driver for the first target device, selecting the third mode of operation during a third and a fourth clock cycle;

for the driver for the initiator device, selecting the first mode of operation during the first phase of the third clock cycle and driving a second address onto the bus;

for the driver for the initiator device, selecting the first mode of operation during the first phase of the fourth clock cycle and driving second data onto the bus;

for the driver for the initiator device, selecting the second mode of operation during the second phase of the fourth clock cycle while driving the second data onto the bus;

wherein the first, second, third and fourth clock cycles are consecutive clock cycles such that the first and second data are transferred over the bus with no intervening turnaround clock cycles.

5. The method for data write operations of claim 3 for use with a second target device different from the first target device, wherein the second target device also includes a three mode bus driver having the three selectable output modes of operation, further comprising the steps of:

for the driver for the second target device, selecting the third mode of operation during a third and a fourth clock cycle;

for the driver for the initiator device, selecting the first mode of operation during the first phase of the third clock cycle and driving a second address onto the bus;

for the driver for the initiator device, selecting the first mode of operation during the first phase of the fourth clock cycle and driving second data onto the bus;

for the driver for the initiator device, selecting the second mode of operation during the second phase of the fourth clock cycle while driving the second data onto the bus;

wherein the first, second, third and fourth clock cycles are consecutive clock cycles such that the first data is transferred to the first target device and the second data is transferred to the second target device with no intervening turnaround clock cycles.

6. A method for data write operations between an initiator device and a first target device coupled to a bus having a clock line and a control line, the clock line carrying a clock signal having a plurality of clock cycles wherein each clock cycle includes a first and second phase, the control line carrying a control signal having active and inactive states wherein the active state is asserted when a target device is ready to accept data from the initiator device, the first target device including a three mode bus driver having three selectable output modes of operation: the first mode being a voltage mode having a voltage output corresponding to the logical state of the data input to the driver and having a low output impedance, the second mode being a current mode having a voltage output corresponding to the logical state of the data input to the driver and having a high output impedance, and a third mode having high output impedance, the three mode bus driver of the first target device being coupled to the control line of the bus, said method comprising the steps of:

for the initiator device, placing a first address on the bus during a first clock cycle;

for the driver of the first target device, selecting the first mode of operation during the first phase of a second clock cycle and driving the control line active;

for the driver of the first target device, selecting the second mode of operation during the second phase of the second clock cycle while driving the control line active; and for the initiator device, placing first data on the bus during the second clock cycle.

7. The method for data write operations of claim 6, further comprising the steps of:

for the driver of the first target device, selecting the first mode of operation and driving the control line inactive during a third clock cycle;

for the initiator device, placing a second address on the bus during the third clock cycle;

for the driver of the first target device, selecting the first mode of operation during the first phase of a fourth clock cycle and driving the control line active;

for the driver of the first target device, selecting the second mode of operation during the second phase of the fourth clock cycle while driving the control line active; and for the initiator device, placing second data on the bus during the fourth clock cycle;

wherein the first, second, third and fourth clock cycles are consecutive clock cycles such that the first and second data are transferred over the bus with no intervening turnaround clock cycles.

8. The method for data write operations of claim 6 for use with a second target device different from the first target device, wherein the second target device also includes a three mode bus driver having the three selectable output modes of operation, the three mode bus driver of the second target device also being coupled to the control line of the bus, the method further comprising the steps of:

for the driver of the second target device, driving the control line inactive during a third clock cycle;

for the initiator device, placing a second address on the bus during the third clock cycle;

for the driver of the second target device, selecting the first mode of operation during the first phase of a fourth clock cycle and driving the control line active;

for the driver of the second target device, selecting the second mode of operation during the second phase of the fourth clock cycle while driving the control line active; and for the initiator device, placing second data on the bus during the fourth clock cycle;

wherein the first, second, third and fourth clock cycles are consecutive clock cycles such that the first data is transferred to the first target device and the second data is transferred to the second target device with no intervening turnaround clock cycles.

9. The method for data write operations of claim 6 for use with a second target device different from the first target device, wherein the second target device includes a two mode bus driver having two selectable output modes of operation, the first mode being a voltage mode having a voltage output corresponding to the logical state of the data input to the driver and having a low output impedance, and the second mode having high output impedance, the two mode bus driver of the second target device also being coupled to the control line of the bus, the method further comprising the steps of:

for the driver of the second target device, selecting the first mode of operation and driving the control line inactive during a third clock cycle;

for the initiator device, placing a second address on the bus during the third clock cycle;

for the driver of the second target device, selecting the first mode of operation and driving the control line active during a fourth clock cycle; and for the initiator device, placing second data on the bus during the fourth clock cycle;

wherein the first, second, third and fourth clock cycles are consecutive clock cycles such that the first data is transferred to the first target device and the second data is transferred to the second target device with no intervening turnaround clock cycles.

10. An information handling system having a data read operation, comprising:

a bus;

a clock generator, coupled to said bus, for generating a clock signal that includes a plurality of clock cycles, wherein each clock cycle includes a first and a second phase; and an initiator and a target device coupled to said bus, wherein each of said initiator and target devices includes a three mode bus driver having three selectable output modes of operation: the first mode being a voltage mode having a voltage output corresponding to the logical state of the data input to the driver and having a low output impedance, the second mode being a current mode having a voltage output corresponding to the logical state of the data input to the driver and having a high output impedance, and a third mode having high output impedance;

wherein said initiator device selects the first mode of operation and drives a first address onto said bus during the first phase of a first clock cycle, said initiator device selects the second mode of operation during the second phase of the first clock cycle while driving the first address onto the bus, and said initiator device selects the third mode of operation during a second clock cycle; and wherein said target device selects the third mode of operation during the first clock cycle, said target device selects the first mode of operation and drives first data onto said bus during the first phase of the second clock cycle, and said target device selects the second mode of operation while driving the first data onto said bus during the second phase of the second clock cycle.

11. The information handling system of claim 10, wherein:

said initiator device selects the first mode of operation and drives a second address onto said bus during the first phase of a third clock cycle, said initiator device selects the second mode of operation while driving the second address onto said bus during the second phase of the third clock cycle and said initiator device selects the third mode of operation during a fourth clock cycle;

said target device selects the third mode of operation during the third clock cycle, said target device selects the first mode of operation and drives second data onto said bus during the first phase of the fourth clock cycle, said target device selects the second mode of operation while driving the second data onto said bus during the second phase of the fourth clock cycle;

wherein the first, second, third and fourth clock cycles are consecutive clock cycles, such that the first and second data are transferred over said bus with no intervening turnaround clock cycles.

12. An information handling system having a data write operation, comprising:

a bus;

a clock generator, coupled to said bus, for generating a clock signal that includes a plurality of clock cycles, wherein each clock cycle includes a first and a second phase; and an initiator and a first target device coupled to said bus, wherein each of said initiator and target devices includes a three mode bus driver having three selectable output modes of operation: the first mode being a voltage mode having a voltage output corresponding to the logical state of the data input to the driver and having a low output impedance, the second mode being a current mode having a voltage output corresponding to the logical state of the data input to the driver and having a high output impedance, and a third mode having high output impedance;

wherein said initiator device selects the first mode of operation and drives a first address onto said bus during the first phase of a first clock cycle, said initiator device selects the first mode of operation and drives first data onto said bus during the first phase of a second clock cycle, and said initiator device selects the second mode of operation while driving the first data onto said bus during the second phase of the second clock cycle; and wherein said first target device selects the third mode of operation during the first and second clock cycles.

13. The information handling system of claim 12, wherein:
  said initiator device selects the first mode of operation and drives a second address onto said bus during the first phase of a third clock cycle, said initiator device selects the first mode of operation and drives second data onto said bus during the first phase of a fourth clock cycle, and said initiator device selects the second mode of operation while driving the second data onto said bus during the second phase of the fourth clock cycle;
  said first target device selects the third mode of operation during the third and fourth clock cycles; and
  wherein the first, second, third and fourth clock cycles are consecutive clock cycles, such that the first and second data are transferred over said bus with no intervening turnaround clock cycles.

14. The information handling system of claim 12, further comprising:
  a second target device different from said first target device, wherein said second target device also includes a three mode bus driver having the three selectable output modes of operation, wherein:
  said initiator device selects the first mode of operation and drives a second address onto said bus during the first phase of a third clock cycle, said initiator device selects the first mode of operation and drives second data onto said bus during the first phase of a fourth clock cycle, and said initiator device selects the second mode of operation while driving the second data onto said bus during the second phase of the fourth clock cycle;
  said second target device selects the third mode of operation during the third and fourth clock cycles;
  wherein the first, second, third and fourth clock cycles are consecutive clock cycles, such that the first data is transferred to said first target device and the second data is transferred to said second target device with no intervening turnaround clock cycles.

15. An information handling system having a data write operation, comprising:
  a bus having a clock line and a control line, the control line carrying a control signal having active and inactive states, wherein the active state is asserted when a device is ready to accept data from another device;
  a clock generator, coupled to said clock line of said bus, for generating a clock signal that includes a plurality of clock cycles, wherein each clock cycle includes a first and a second phase; and
  an initiator device;
  a first target device including a three mode bus driver having three selectable output modes of operation: the first mode being a voltage mode having a voltage output corresponding to the logical state of the data input to the driver and having a low output impedance, the second mode being a current mode having a voltage output corresponding to the logical state of the data input to the driver and having a high output impedance, and a third mode having high output impedance, said three mode bus driver of said first target device being coupled to the control line of said bus;
  wherein said initiator device places a first address on said bus during a first clock cycle, and said initiator device places first data on said bus during a second clock cycle;
  wherein said first target device selects the first mode of operation and drives the control line active during the first phase of the second clock cycle, and said first target device selects the second mode of operation while driving the control line active during the second phase of the second clock cycle.

16. The information handling system of claim 15, wherein:
  said initiator device places a second address on said bus during a third clock cycle, and said initiator device places second data on said bus during a fourth clock cycle;
  said first target device selects the first mode of operation and drives the control line inactive during the third clock cycle, said first target device selects the first mode of operation and drives the control line active during the first phase of the fourth clock cycle, and said first target device selects the second mode of operation while driving the control line active during the second phase of the fourth clock cycle; and
  wherein the first, second, third and fourth clock cycles are consecutive clock cycles such that the first and second data are transferred over said bus with no intervening turnaround clock cycles.

17. The information handling system of claim 15, further comprising:
  a second target device different from said first target device, wherein said second target device also includes a three mode bus driver having the three selectable output modes of operation, the three mode bus driver of said second target device also being coupled to the control line of said bus;
  wherein said initiator device places a second address on said bus during a third clock cycle, and said initiator device places second data on said bus during a fourth clock cycle;
  wherein said second target device drives the control line of said bus inactive during the third clock cycle, said second target device selects the first mode of operation and drives the control line active during the first phase of the fourth clock cycle, and said second target device selects the second mode of operation while driving the control line active during the second phase of the fourth clock cycle; and
  wherein the first, second, third and fourth clock cycles are consecutive clock cycles such that the first data is transferred to the first target device and the second data is transferred to the second target device with no intervening turnaround clock cycles.

18. The information handling system of claim 15, further comprising:
  a second target device different from said first target device, wherein said second target device includes a two mode bus driver having two selectable output modes of operation, the first mode being a voltage mode having a voltage output corresponding to the logical state of the data input to the two mode driver and having a low output impedance, and the second mode having high output impedance, the two mode bus driver of said second target device also being coupled to the control line of said bus;
  wherein said initiator device places a second address on said bus during a third clock cycle, and said initiator device places second data on said bus during a fourth clock cycle;
  wherein said second target device selects the first mode of operation and drives the control line inactive during the third clock cycle, and the second target device selects the first mode of operation and drives the control line active during the fourth clock cycle; and wherein the first, second, third and fourth clock cycles are consecutive clock cycles, such that the first data is transferred to said first target device and the second data is transferred to said second target device with no intervening turnaround clock cycles.

* * * * *